UNITED STATES PATENT OFFICE.

WILLARD PARKER KING, OF TRURO, NOVA SCOTIA, CANADA.

REMEDY FOR DYSPEPSIA.

SPECIFICATION forming part of Letters Patent No. 426,566, dated April 29, 1890.

Application filed December 6, 1889. Serial No. 332,812. (No specimens.) Patented in Canada November 2, 1889, No. 32,720.

*To all whom it may concern:*

Be it known that I, WILLARD PARKER KING, a subject of the Queen of Great Britain, residing at Truro, in the county of Colchester and Province of Nova Scotia, in the Dominion of Canada, have invented a new and useful composition of matter to be used for the relief of dyspepsia, indigestion, heartburn, flatulency, dizziness, pain and distress after eating, or vomiting caused by food not digesting, (for which I have obtained a patent in Canada, No. 32,720, dated November 2, 1889,) of which the following is a specification.

My composition consists of the following ingredients, combined in the proportions stated, viz: Of avoirdupois weight, take six pounds bicarbonate of soda, twelve ounces powdered pepsin, twelve ounces subnitrate of bismuth, six ounces powdered Jamaica ginger-root, six ounces powdered gentian-root, and three ounces powdered licorice-root. Make a mixture. To every five ounces of this mixture add one pint of soft water. This mixture to be taken by the user after being well shaken and in doses of one table-spoonful after each meal.

I am aware that a composition consisting of bicarbonate of soda, pepsin, subnitrate of bismuth, and ginger, with water, has been used for the same purpose. I am also aware that gentian has been used in the treatment of dyspepsia; but I am not aware that all the ingredients of my composition in the proportions stated have been used together.

What I claim, and desire to secure by Letters Patent of the United States, is—

The herein-described composition of matter to be used for the relief of dyspepsia, indigestion, heartburn, flatulency, dizziness, pain and distress after eating, or vomiting caused by food not digesting in mankind, consisting of bicarbonate of soda, pepsin, subnitrate of bismuth, ginger, gentian-root, and licorice-root, with water, in the proportions and to be used in the way specified.

WILLARD PARKER KING.

Witnesses:
 THOMAS M. KING,
 NORMAN J. LAYTON.